United States Patent
Unanua Hermoso de Mendoza (10) Patent No.: US 11,851,902 B2
(45) Date of Patent: Dec. 26, 2023

(54) TOWER ARRANGEMENT FOR A WIND TURBINE, WIND TURBINE COMPRISING THE TOWER ARRANGEMENT AND METHOD FOR ERECTING A WIND TURBINE

(71) Applicant: Siemens Gamesa Renewable Energy Innovation & Technology S.L., Sarriguren (ES)

(72) Inventor: Pablo Unanua Hermoso de Mendoza, Olloki (ES)

(73) Assignee: SIEMENS GAMESA RENEWABLE ENERGY INNOVATION & TECHNOLOGY S.L.

( * ) Notice: Subject to any disclaimer, the term of this patent is extended or adjusted under 35 U.S.C. 154(b) by 10 days.

(21) Appl. No.: 17/328,375

(22) Filed: May 24, 2021

(65) Prior Publication Data
US 2021/0363774 A1 Nov. 25, 2021

(30) Foreign Application Priority Data

May 25, 2020 (EP) .................................... 20382437

(51) Int. Cl.
*E04H 12/20* (2006.01)
*F03D 13/20* (2016.01)

(52) U.S. Cl.
CPC ............. *E04H 12/20* (2013.01); *F03D 13/22* (2016.05)

(58) Field of Classification Search
CPC ......... E04H 12/20; F16B 39/282; F16B 43/02
See application file for complete search history.

(56) References Cited

U.S. PATENT DOCUMENTS 10,337,185 B2 * 7/2019 Espinosa ................. E04H 9/021
2015/0308139 A1 10/2015 Wagner
(Continued)

FOREIGN PATENT DOCUMENTS

| CN | 210049990 U | * | 2/2020 |
| CN | 210049990 U | | 2/2020 |
| DE | 102014100814 A1 | | 3/2015 |

OTHER PUBLICATIONS

Extended European Search Report in corresponding European Patent Application No. 20382437.0 dated Nov. 18, 2020. 7 pages.

*Primary Examiner* — Andrew J Triggs
(74) *Attorney, Agent, or Firm* — Schmeiser, Olsen & Watts LLP (57) ABSTRACT

A tower arrangement for a wind turbine, including: a guyed tower, cable foundations each including a through-hole, one or more stay cables, each stay cable being anchored at its first end at the tower and being anchored at its second end at one of the cable foundations, and one or more anchoring means for anchoring the second end of each stay cable at the respective cable foundation, wherein each stay cable is guided through a respective through-hole and anchored, with respect to its first end, behind the respective through-hole at its second end using the anchoring means is provided. By having the cable foundations comprising the through-holes, guiding the stay cables through the through-holes and anchoring them behind the through-holes, external connection means such as steel structures poured into the concrete foundation are not required. Thus, the anchoring of the stay cables at the cable foundations is simplified.

16 Claims, 10 Drawing Sheets

(56) References Cited

U.S. PATENT DOCUMENTS

2018/0003158 A1     1/2018   Pedersen et al.
2021/0363774 A1*   11/2021   Unanua Hermoso de Mendoza ................ F03D 13/22

* cited by examiner

TOWER ARRANGEMENT FOR A WIND TURBINE, WIND TURBINE COMPRISING THE TOWER ARRANGEMENT AND METHOD FOR ERECTING A WIND TURBINE

CROSS-REFERENCE TO RELATED APPLICATIONS

This application claims priority to European Patent Application No. 20382437.0, having a filing date of May 25, 2020, the entire contents of which are hereby incorporated by reference.

FIELD OF TECHNOLOGY

The following relates to a tower arrangement for a wind turbine, a wind turbine comprising the tower arrangement and a method for erecting a wind turbine.

BACKGROUND

The energy production of a wind turbine at a given site increases with the height of the rotor hub and, thus, with the height of the tower. However, when increasing the tower height structural requirements of the tower are one of the challenging and limiting factors.

Wind turbine towers are subject to various loads such as static loads from the weight of the nacelle and the tower itself, and dynamic loads for example arising from the rotor thrust and from spatially uneven and temporally unsteady oncoming wind. Further, wind turbine towers being tall thin structures are generally susceptible to vibrations. Therefore, resonance induced-loads due to excitations near the eigenfrequency of the tower can play an important role.

Increasing the height of a wind turbine tower requires to increase its structural strength and rigidity. Increasing the diameter of the tower and/or the thickness of its wall is limited by transportation and cost issues.

Alternatively, the structural strength and rigidity of a wind turbine tower can be increased by designing it as a guyed tower using stay cables. The stay cables are conventionally anchored at cable foundations by means of connecting the stay cables to connectors and casting the connectors into a concrete foundation.

SUMMARY

It is one aspect of the present invention to provide an improved tower arrangement for a wind turbine, an improved wind turbine and an improved method for assembling a wind turbine.

According to a first aspect, a tower arrangement for a wind turbine is provided. The tower arrangement comprises:
  a guyed tower,
  one or more cable foundations each including a through-hole,
  one or more stay cables, each stay cable being anchored at its first end at the tower and being anchored at its second end at one of the cable foundations, and
  one or more anchoring means for anchoring the second end of each stay cable at the respective cable foundation,
wherein each stay cable is guided through a respective through-hole and anchored, with respect to its first end, behind the respective through-hole at its second end using the anchoring means.

By having the cable foundations with the through-holes, guiding the stay cables through the through-holes and anchoring them behind the through-holes, external connection means, such as steel structures, poured into the concrete foundation are not required. Thus, the anchoring of the stay cables at the cable foundations is simplified.

A wind turbine is an apparatus to convert the wind's kinetic energy into electrical energy. The wind turbine comprises, for example, a rotor having one or more blades, a nacelle comprising a generator and a tower holding, at its top end, the nacelle. The tower of the wind turbine is connected to a foundation of the wind turbine. The wind turbine is, in particular, an onshore wind turbine.

The tower has, for example a height of 120-180 meter or more. The tower is, in particular, a guyed wind turbine tower. The stay cables anchored at the tower and at the cable foundations support the structural rigidity and stiffness of the tower. Thus, the stay cables ensure the stability of the tower with respect to fatigue loads and extreme loads. In particular, the stay cables ensure the stability of the tower with respect to dynamic events caused by wind.

The tower arrangement comprises the guyed tower and, for example, three cable foundations, three stay cables and three anchoring means. The tower arrangement may also comprise another number (four, five etc.) of cable foundations, stay cables and anchoring means.

The tower comprises, for example, several tower sections bolted to each other at tower section flanges. The stay cables are anchored, for example, at one of the tower sections, e.g., a tower section of an upper half of the tower.

The cable foundations comprise, in particular, concrete, reinforced concrete and/or are concrete blocks. Reinforced concrete is concrete containing metal such as steel. Reinforced concrete is concrete comprises, for example, steel bars, rods or mesh.

The cable foundation has, for example, the shape of a cuboid, cube, cylinder, parallelepiped or any other suitable three-dimensional shape. The geometry of the cable foundations depends, for example, on the properties of the surrounding soil. In particular, it depends on the water content of the soil, the cohesion and internal friction of grains in the soil and the grain sizes. For example, soils containing clay provide a better support for cable foundations than soils containing sand. The better the holding capability of the soil, the smaller and/or more compact the cable foundation can be designed.

The through-holes of the cable foundations are, in particular, elongated through-holes. Each through-hole comprises an entrance opening where the respective stay cable extending from the tower enters the through-hole. Further, each through-hole comprises an exit opening behind which the stay cable is anchored by means of the anchoring means.

Each stay cable is, in particular, anchored, with respect to a direction from the first anchoring point to the second anchoring point (i. e. with respect to a direction from the tower to the respective cable foundation along the respective stay cable), behind a respective through-hole at its second end using the anchoring means.

A diameter and/or cross-section of the through-holes is, in particular, smaller than a diameter of the stay cable. For example, each through-holes comprises, as seen in cross-section, in addition to the stay cable, also free space sufficient enough to allow for a misalignment of a few degrees of an axis of the through hole and an axis of the stay cables, when the stay cable is tensioned.

A portion of each stay cable is guided from the entrance opening of the respective through-hole to the exit opening of the through-hole.

Each stay cable comprises, in particular, the first end anchored at the tower, an exposed portion, the portion being guided through the through-hole and the second end anchored at the cable foundation by the anchoring means.

Each of the one or more stay cables is extending continuously between its first end anchored at a first anchoring point at the tower and its second end anchored at a second anchoring point at the anchoring means. Further, the exposed portion is contiguous with the first end, the portion being guided through the through-hole is contiguous with the exposed portion, and the portion being guided through the through-hole is contiguous with the second end.

The stay cables are structural members with high resistance to tensile stresses. The stay cables are made for example, from metal, in particular steel, e.g., high strength steel.

Each stay cable includes, for example, several tendons.

The stay cables are, for example, strand cables or strand ropes. The stay cables are, for example, spiral strand cables/ ropes including helically arranged wires.

The stay cables are, for example, (fully) locked coil strands or ropes including z-section wires.

Each stay cable includes, for example, a cable core. Each stay cable includes, for example, a coating.

According to an embodiment, each of the one or more anchoring means engage with the respective cable foundation in a form fit.

Thus, the anchoring means are resting against the cable foundation and prevent movement of the anchoring means in the direction of the first end of the stay cable.

According to a further embodiment, each cable foundation comprises, with respect to the first end of the respective stay cable, a front side and a back side, and the respective anchoring means engage with the back side.

The front side and the back side may be inclined to each other or may be parallel to each other. The front side comprises, in particular the entrance opening of the through-hole. The back side comprises, in particular the exit opening of the through-hole. In particular, a surface of the anchoring means engages with the back side of the cable foundation in a form fit.

According to a further embodiment, each of the one or more anchoring means include an anchoring plate, and a size of the anchoring plate is larger than a diameter of the through-hole of the respective cable foundation.

The anchoring plate includes, in particular, two plate surfaces and a through-hole extending from one plate surface to the other plate surface. One of the plate surfaces is, in particular, resting against the back side of the cable foundation in a region surrounding the through-hole of the cable foundation.

According to a further embodiment, one, several or all of the one or more anchoring means include means to compensate for a misalignment between an axis of a through-hole and an axis of a respective stay cable.

Having the compensation means allows a larger tolerance of the final positions of the erected tower, the anchoring points of the stay cables at the tower and the cable foundations with respect to each other. Thus, it allows a larger tolerance when erecting the tower, connecting the stay cables with the tower and arranging the cable foundations.

According to a further embodiment, each of the one or more anchoring means includes an anchoring plate, and each anchoring plate includes two plate surfaces being parallel to each other or inclined to each other by an angle of at least 0.5°, 1°, 2°, 3°, 4° and/or 5°.

Thus, an angle deviation of several degrees between the axis of the through-hole of a respective cable foundation and the axis of a stay cable guided through the through-hole can be compensated by selecting a suitable anchoring plate.

According to a further embodiment,
one, several or all of the one or more anchoring means include a spherical washer, a mating concave nut and an anchoring plate,
the spherical washer is arranged, with respect to the first end of the respective stay cable, behind the anchoring plate with a spherical surface of the spherical washer facing the anchoring plate, and
the mating concave nut is arranged between the spherical washer and the anchoring plate such that a concave surface of the mating concave nut engages with the spherical surface of the washer.

Having the spherical washer and the mating concave nut allows a self-alignment of the spherical washer and the nut in response to anchoring the respective stay cable at the cable foundation and tensioning the stay cable. In particular, an angle between a rotational-symmetry axis of the spherical washer and a rotational-symmetry axis of the mating concave nut is adjusted in a self-regulating manner. Thus, it can be compensated for a misalignment between the axis of a stay cable and the axis of a respective through-hole of the cable foundation. For example, it can be compensated for a misalignment of up to several degrees between the axis of the stay cable and the axis of the through-hole.

According to a further embodiment, each stay cable comprises at its second end a cable head including a flange resting against the anchoring means.

Thus, the flange of the cable head is engaging in a form fit with a surface of the anchoring means providing a reliable anchoring of the stay cables.

According to a further embodiment, one, several or all of the one or more cable foundations are arranged above ground or at least partly below ground.

By arranging the cable foundation entirely or partly above ground, the anchoring means can also be easily arranged above ground and are, therefore, easily accessible by a worker.

For example, the back side of the cable foundation including the exit opening of the through-hole may be inclined with respect to a surface of the surrounding ground. Then, the back side of the cable foundation can be entirely or partly extending from the ground and is easily accessible.

By arranging the cable foundation entirely or partly below ground, the cable foundation may have a better support capability.

Also in this case, the back side of the cable foundation including the exit opening of the through-hole may be inclined with respect to a surface of the surrounding ground. Then, a passage way through the ground behind the cable foundation may provide access to the anchoring means.

According to a further embodiment, one, several or all of the one or more cable foundations include a cavity accommodating the respective anchoring means and the second end of the respective stay cable.

Having the cavity, the anchoring means and the second end of the stay cable are better protected.

The cavity of each cable foundation is, in particular, in communication with its through-hole. The cavity is, in particular, in communication with the exit opening of the through-hole. Further, the cavity is arranged, with respect to the first end of the respective stay cable, behind the through-hole.

According to a second aspect, a wind turbine is provided. The wind turbine comprises a tower arrangement as described above.

According to a third aspect, a method for erecting a wind turbine is proposed. The method comprises the steps of:
a) providing an erected tower or tower section,
b) connecting at least one stay cable at its first end to the tower or tower section,
c) providing at least one cable foundation including a through-hole,
d) guiding each stay cable through the through-hole of a respective cable foundation, and
e) anchoring each stay cable at its second end, with respect to its first end, behind the respective through-hole using anchoring means.

Step b) may be carried out after step a) or before step a). That means, the tower or tower section may be firstly erected and the stay cables are then connected to the erected tower (section). Alternatively, the stay cables are firstly connected to the tower or tower section (e.g., to a horizontally arranged tower or to a horizontally or vertically arranged tower section) and the tower (section) with the stay cables is then erected.

Furthermore, step b) may be carried out before steps d) and e) or may be carried out after steps d) and e). That means, the stay cables may be firstly anchored at the tower (section) and may be anchored at the cable foundations in a second step or vice versa.

According to an embodiment of the third aspect, the method includes the step of compensating for a misalignment between an axis of a through-hole and an axis of a respective stay cable.

According to a further embodiment of the third aspect, one or more of the anchoring means include an anchoring plate having two plate surfaces. Further, the step of compensating for a misalignment includes selecting the respective anchoring plate from a group comprising an anchoring plate whose two plate surfaces are parallel to each other and anchoring plates whose two plate surfaces are inclined to each other by an angle of at least 0.5°, 1°, 2°, 3°, 4° and 5°.

According to a further embodiment of the third aspect, one or more of the anchoring means include an anchoring plate, a spherical washer and a mating concave nut. Further, the step of compensating for a misalignment includes engaging, for a respective anchoring means, a spherical surface of the spherical washer with a concave surface of the mating concave nut such that an angle between an axis of the spherical washer and an axis of the mating concave nut is adjusted.

According to embodiments of the third aspect, the method includes the step of tensioning each of the one or more stay cables between its first end anchored at a first anchoring point at the tower or tower section and its second end anchored at a second anchoring point at the respective anchoring means.

The embodiments and features described with reference to the tower section arrangement of the present invention apply mutatis mutandis to the tower, the wind turbine and the method of the present invention and vice versa.

Further possible implementations or alternative solutions of the present invention also encompass combinations—that are not explicitly mentioned herein—of features described above or below with regard to the embodiments. The person skilled in the art may also add individual or isolated aspects and features to the most basic form of the present invention.

BRIEF DESCRIPTION

Some of the embodiments will be described in detail, with reference to the following figures, wherein like designations denote like members, wherein.

DETAILED DESCRIPTION

In the Figures, like reference numerals designate like or functionally equivalent elements, unless otherwise indicated.

Figure 1:
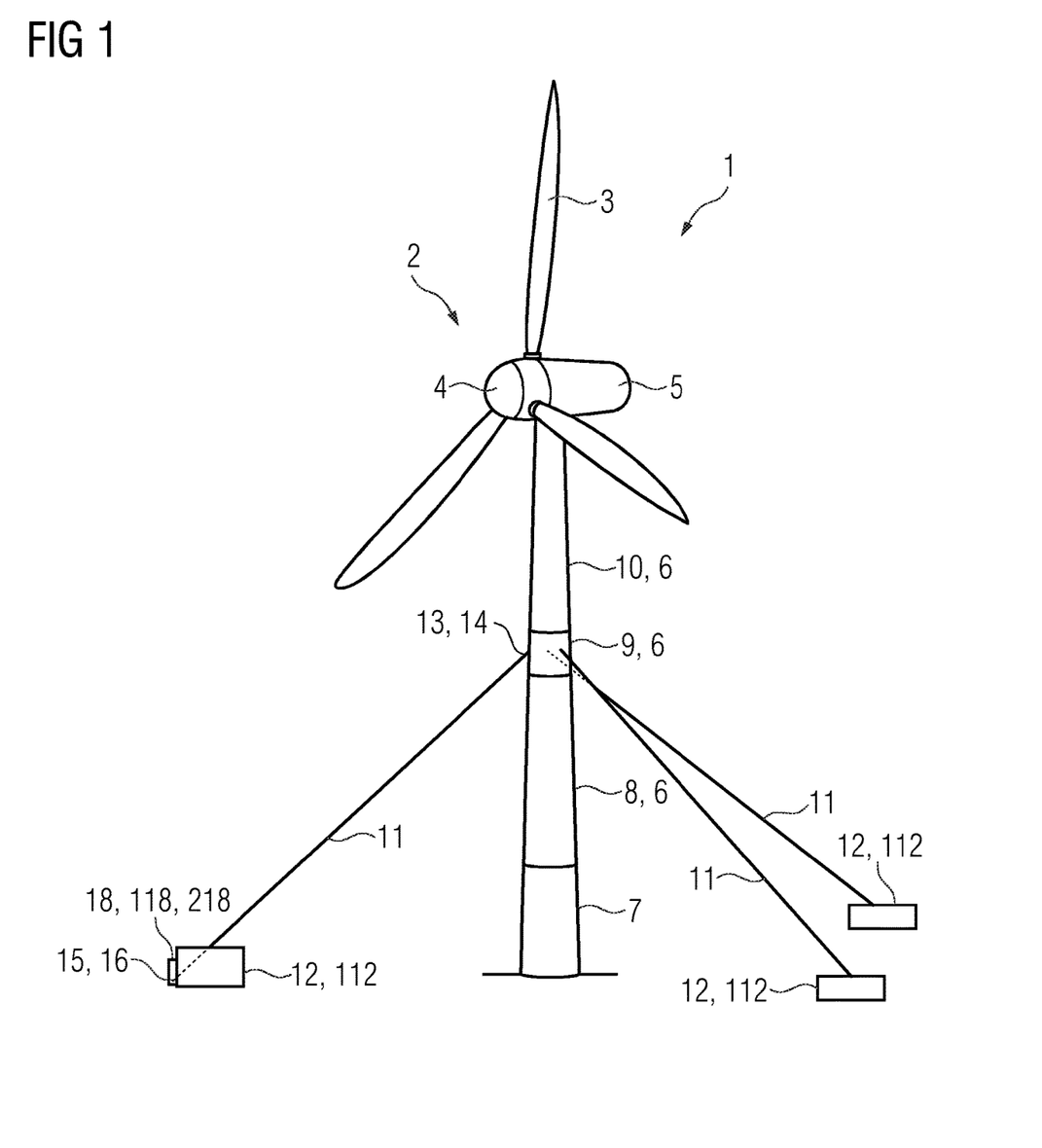
FIG. 1 depicts a wind turbine according to an embodiment.

FIG. 1 shows a wind turbine 1 according to an embodiment.

The wind turbine 1 comprises a rotor 2 having, for example, three rotor blades 3. The rotor blades 3 are connected to a hub 4 of the wind turbine 1. The rotor 2 is connected to a generator (not shown) arranged inside a nacelle 5. The nacelle 5 is arranged at the upper end of a tower 6 of the wind turbine 1. The nacelle 5 is connected to the tower 6, for example by a yaw bearing (not shown) such that the nacelle 5 can rotate relative to the tower 6. The tower 6 is, for example, erected on a monopile 7 founded in the ground. The wind turbine 1 is, in particular, an onshore wind turbine.

The wind turbine 1 converts the wind's kinetic energy into electrical energy. The higher the hub 4, i.e. the higher the tower 6, the more electrical energy can be generated with a wind turbine at a given wind harvesting site.

The tower 6 has, for example, a height of 120-180 meters. The tower 6 comprises, for example, several tower sections such as the tower sections 8, 9, 10 shown schematically in FIG. 1. The tower 6 is a guyed tower comprising stay cables 11. Each stay cable 11 is tethered between the tower section 9 and a respective cable foundation 12.

In particular, each stay cable 11 is connected at its first end 13 to the tower section 9 providing a first anchoring point 14 for the stay cable 11. The connection of the stay cables 11 to the tower section 9 is performed in a known way.

Further, each stay cable 11 is connected at its second end 15 to the cable foundation 12 providing a second anchoring point 16 for the stay cable 11.

The connection of the second end 15 of the stay cables 11 to the cable foundations 12 is described in the following.

Figure 2:
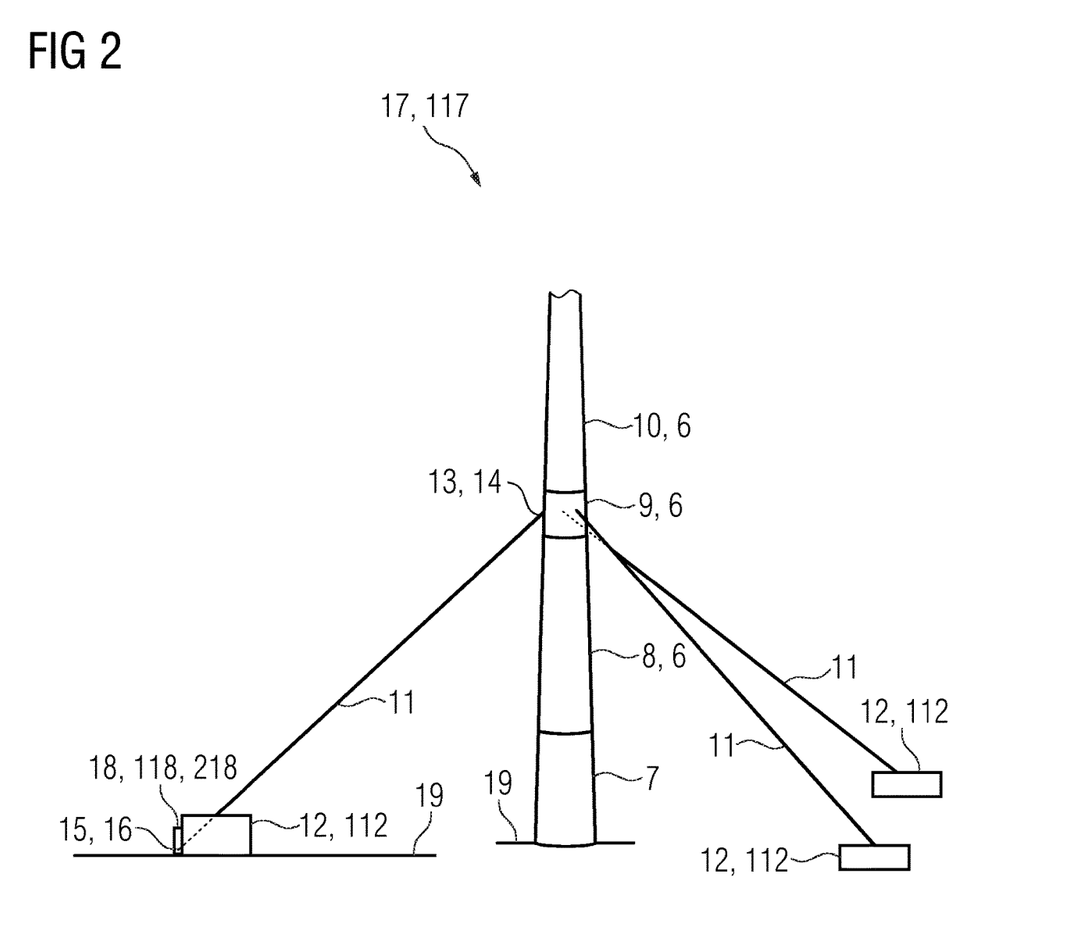
FIG. 2 depicts a tower arrangement of the wind turbine of FIG. 1.

FIG. 2 shows a tower arrangement 17, 117. The tower arrangement 17, 117 comprises the guyed tower 6, three cable foundations 12, 112, three stay cables 11 and three anchoring means 18, 118, 218 for anchoring the second end 15 of each stay cable 11 at the respective cable foundation 12, 112. In FIG. 2, only one of the three anchoring means 18, 118, 218 is shown and denoted with a reference sign.

Figure 6:
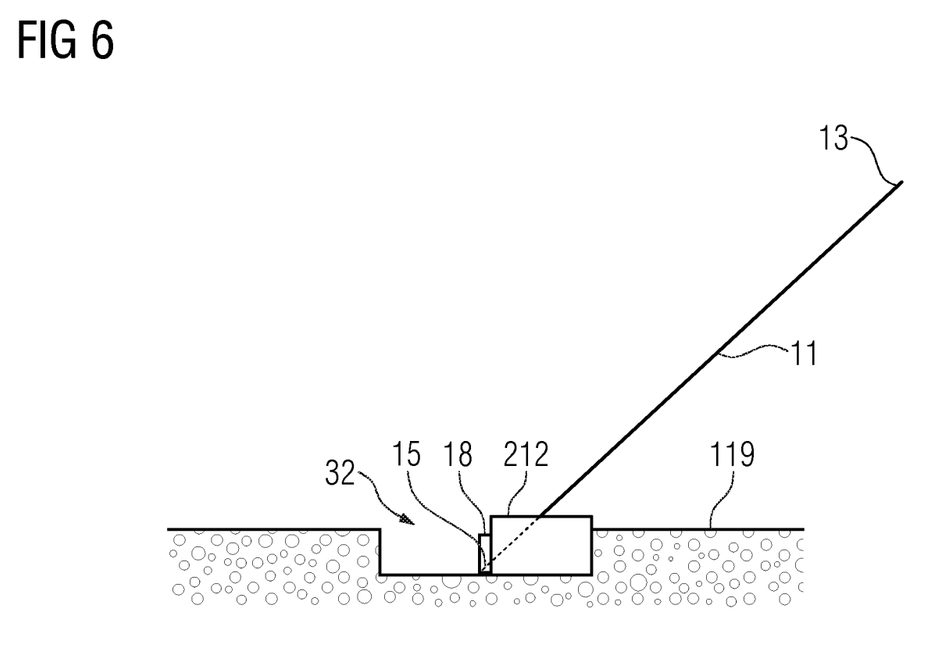
FIG. 6 depicts a cable foundation of FIG. 2 partly arranged below ground.

In the example of FIG. 2, the cables foundations 12, 112 are arranged above the ground 19. However, the cables foundations may also be arranged (partly) below the ground 19 (FIG. 6).

Figure 3:
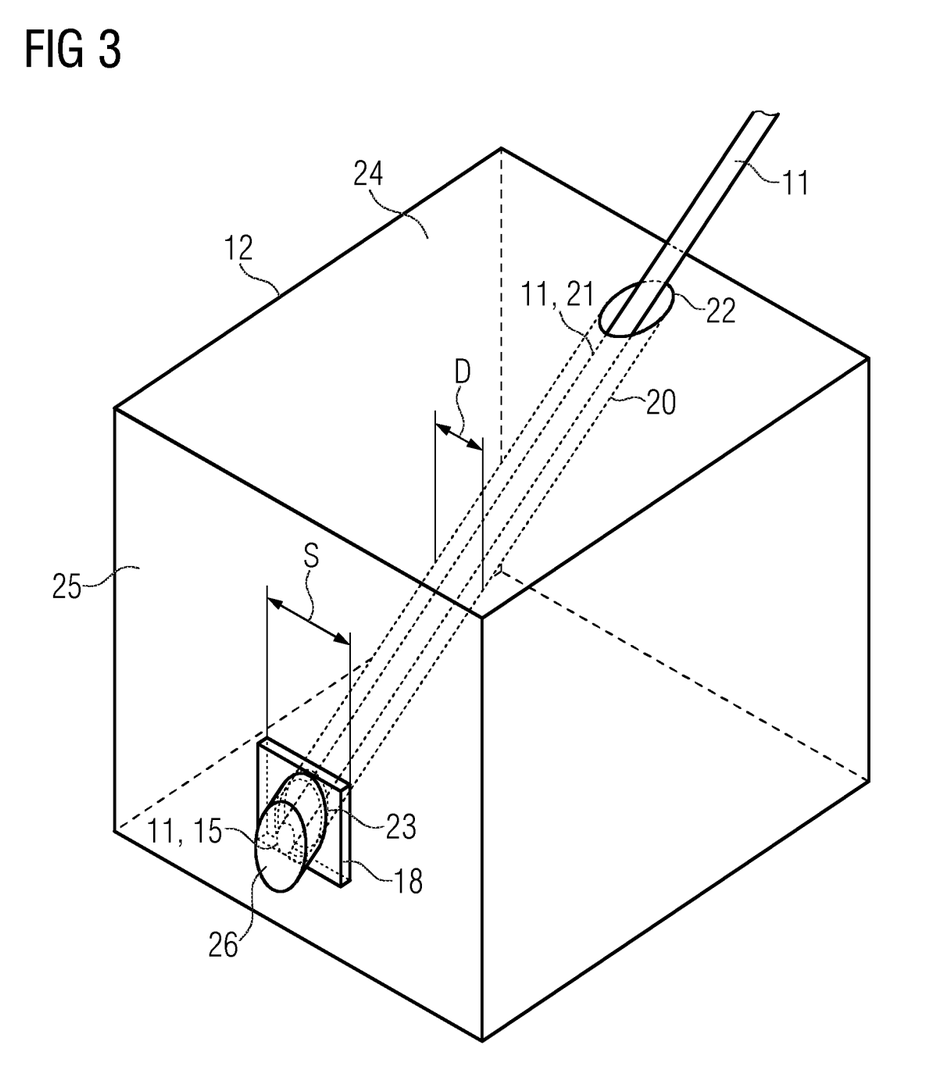
FIG. 3 depicts a detailed view of a cable foundation and a stay cable of the tower arrangement of FIG. 2 according to a first embodiment.

FIG. 3 shows a detailed view of one of the cable foundations 12 according to a first embodiment. Further, one of the stay cables 11 anchored to this cable foundation 12 is shown.

The cable foundations 12 are made, for example, from concrete, e.g., reinforced concrete.

Each cable foundation 12 comprises an elongated through-hole 20 to accommodate a portion 21 of the respective stay cable 11. The through-hole 20 has, for example, a circular cross-section. The through-hole 20 comprises an entrance opening 22 where the respective stay cable 11 extending from the tower 6 (FIG. 2) enters the through-hole 20. Further, the through-hole 20 comprises an exit opening 23 behind which the stay cable 11 is anchored by means of the anchoring means 18. The anchoring means 18 in this example is an anchoring plate 18.

The cable foundations 12 can have many different geometrical shapes such as a cuboid, a parallelepiped or a cylinder. In the shown example, the cable foundation 12 is a cuboid. The cable foundation 12 in FIG. 3 comprises, with respect to the first end 13 (FIG. 2) of the respective stay cable 11, a front side 24 and a back side 25. The front side 24 comprises the entrance opening 22 of the through-hole 20. The back side 25 comprises the exit opening 23 of the through-hole 20. In this example, the front side 24 and the back side 25 are inclined relative to each other. In other examples, the front side 24 and the back side 25 may be parallel to each other.

The stay cable 11 is passing through the through-hole 20 such that it extends with its second end 15 through the exit opening 23 from the back side 25 of the cable foundation 12. Further, the stay cable 11 is anchored at its second end 15 by using the anchoring plate 18. With respect to a direction from the first end 13 (i.e. the first anchoring point 14) to the second end 15 (i.e. the second anchoring point), the stay cable 11 is anchored at its second end 15 behind the through-hole 20.

The second end 15 of the stay cable comprises a cable head 26 resting against the anchor plate 18.

Figure 4:
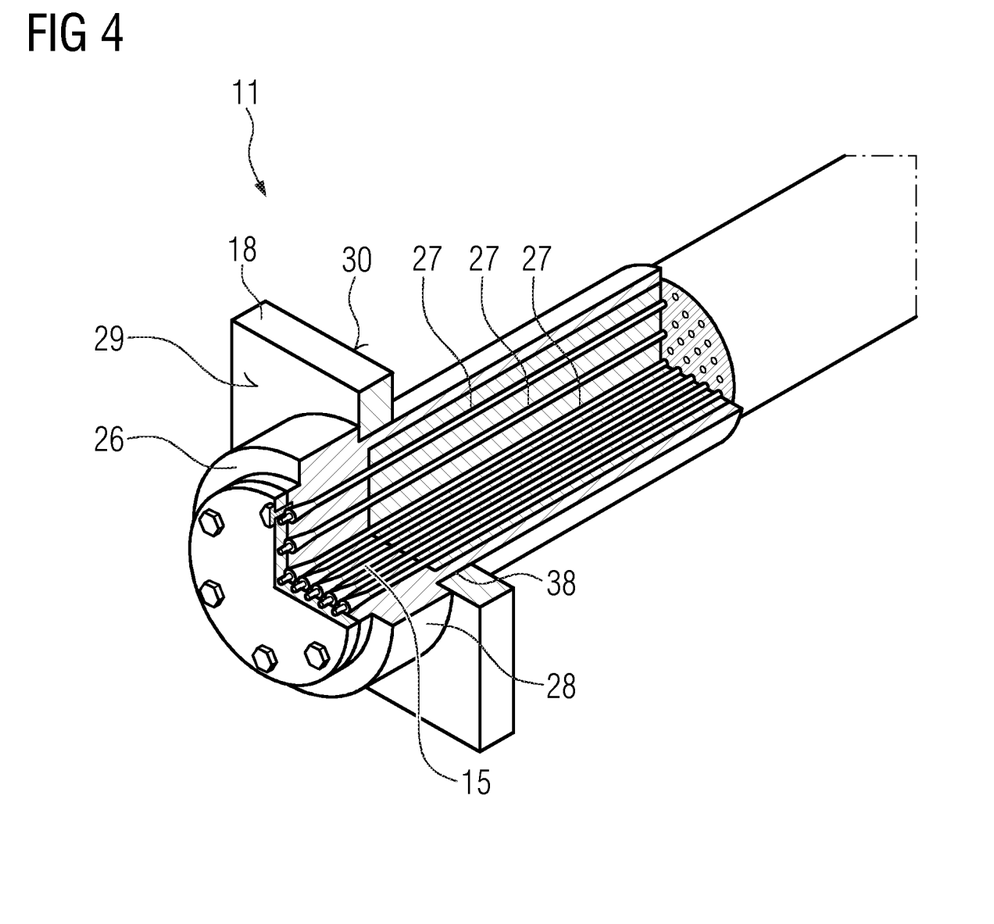
FIG. 4 depicts a detailed view of the stay cable of FIG. 3 close to its second end.

FIG. 4 shows a detailed view of a portion of FIG. 3 illustrating the stay cable 11 close to its second end 15. Also shown in FIG. 4 is the anchoring plate 18. The respective cable foundation 12 is not shown in FIG. 4 for clarity.

Each stay cable 11 comprises several tendons 27. The tendons 27 are fixed to the cable head 26. The cable head 26 comprises a flange 28 resting against the anchoring plate 18. In particular, the flange 28 of the cable head 26 is engaging a first surface 29 of the anchoring plate 18 in a form fit.

Furthermore, a second surface 30 of the anchoring plate 18 is engaging with the back side 25 of the cable foundation 12 (FIG. 3) in a form fit. In particular, a size S of the anchoring plate 18 (FIG. 3) is larger than a diameter D of the through-hole 20 of the respective cable foundation 12.

Figure 5:
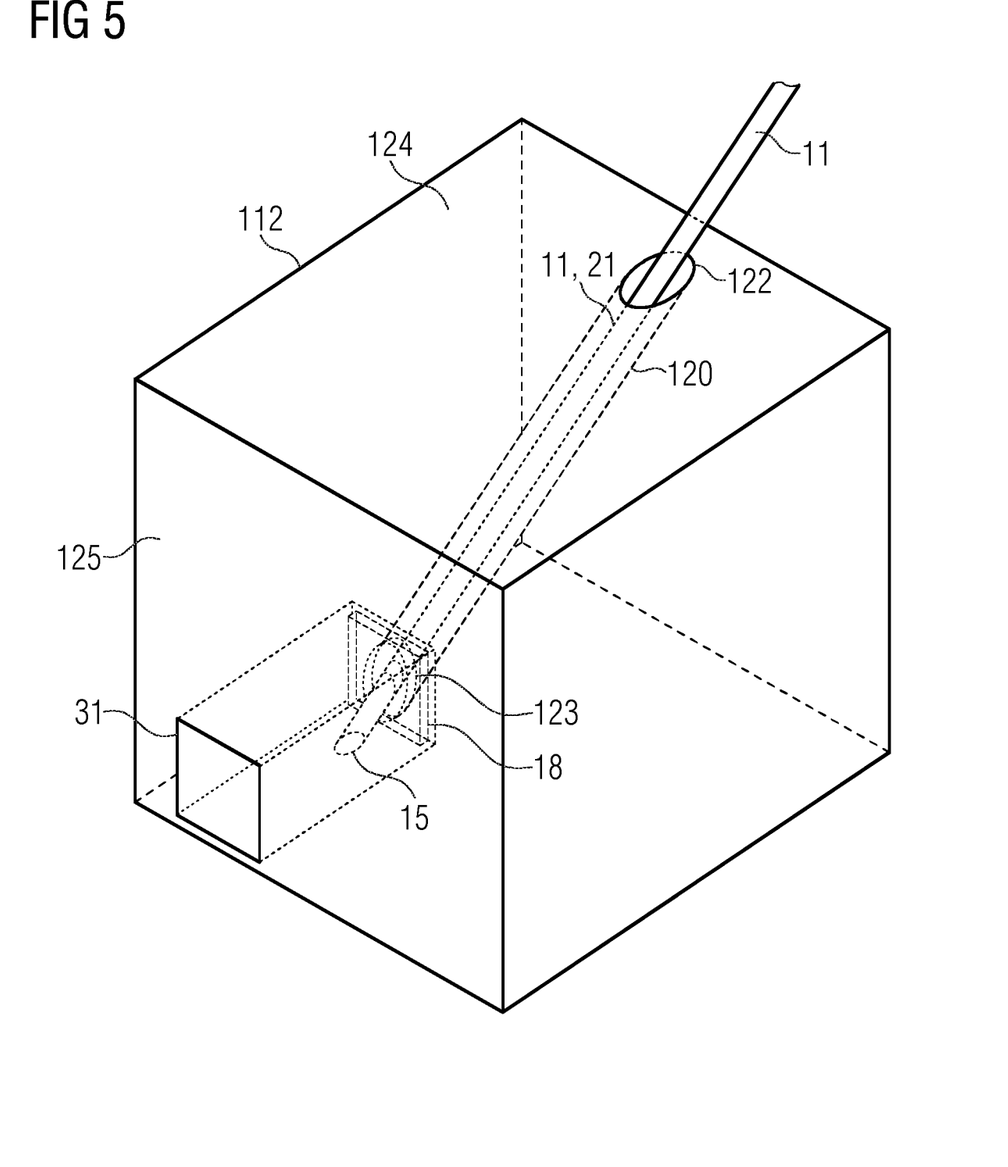
FIG. 5 depicts a detailed view of a cable foundation and a stay cable of the tower arrangement of FIG. 2 according to a second embodiment.

FIG. 5 shows a detailed view of one of the cable foundations 112 of the tower arrangement 117 (FIG. 2) along with one of the stay cables 11 anchored to this cable foundation 112 according to a second embodiment.

The cable foundation 112 according to the second embodiment is similar as the cable foundation 12 according to the first embodiment apart from a cavity 31. In the following only differences to the first embodiment will be described while a description of identical or similar features is omitted.

As shown in FIG. 5, the cavity 31 of the cable foundation 112 is in communication with the through-hole 120. The cavity 31 is, in particular, in communication with the exit opening 123 of the through-hole 120. Further, the cavity 31 is arranged, with respect to the first end 13 (FIG. 2) of the respective stay cable 11, behind the through-hole 120.

The cavity 31 accommodates the anchoring plate 18 and the second end 15 of the respective stay cable 11. In this manner, the anchoring plate 18 and the second end 15 of the stay cable 11 are better protected.

While the cable foundation 12, 112 in FIG. 2 is arranged entirely above the ground 19, in other examples, the cable foundation 12, 112, 212 may also be arranged partly below the ground 119, as illustrated in FIG. 6. In this case, a passage way 32 through the ground 119 may be provided. The passage way 32 is, in particular arranged, with respect to the first end 13 of the stay cable 11, behind the cable foundation 212. The passage way 32 allows access to the anchoring means 18 and the second end 15 of the stay cable 11.

Figure 7:
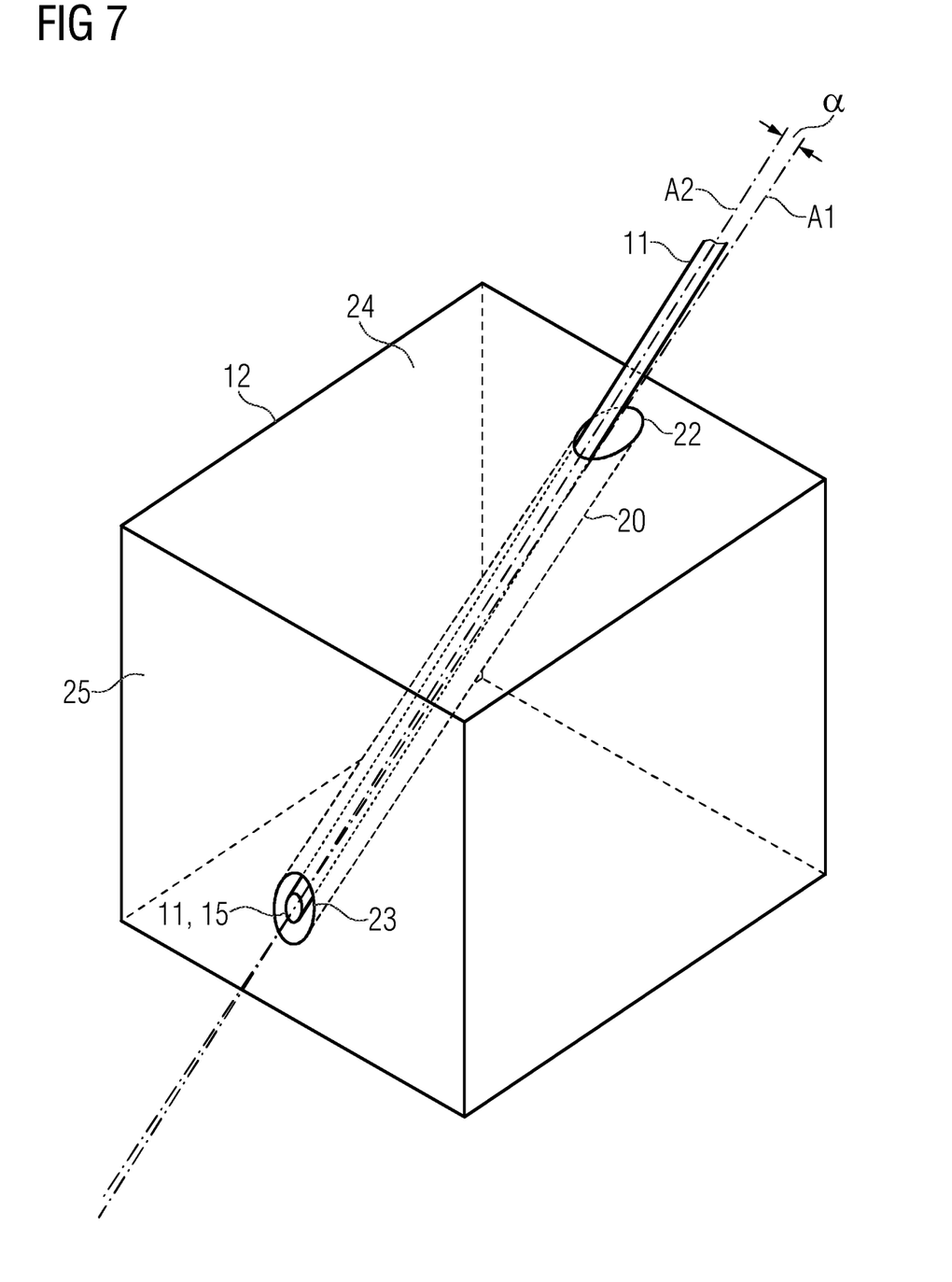
FIG. 7 depicts a misalignment between an axis of a through-hole of a cable foundation and an axis of a stay cable guided through the through-hole.

As shown in FIG. 7, there may be a misalignment between an axis A1 of a through-hole 20 of an arranged cable foundation 12 and an axis A2 of a stay cable 11 guided through the through-hole 20. For example, an angle α between the axis A1 of the through-hole 20 and the axis A2 of the stay cable 11 may have a value of up to several degrees.

In order to allow for larger tolerances when erecting the tower 6, connecting the stay cables 11 with the tower 6 and arranging the cable foundations 12, 112, 212, the anchoring means 118, 218 may include means to compensate for such a misalignment between the axis A1 of the through-hole 20 and the axis A2 of the stay cable 11.

Figure 8:
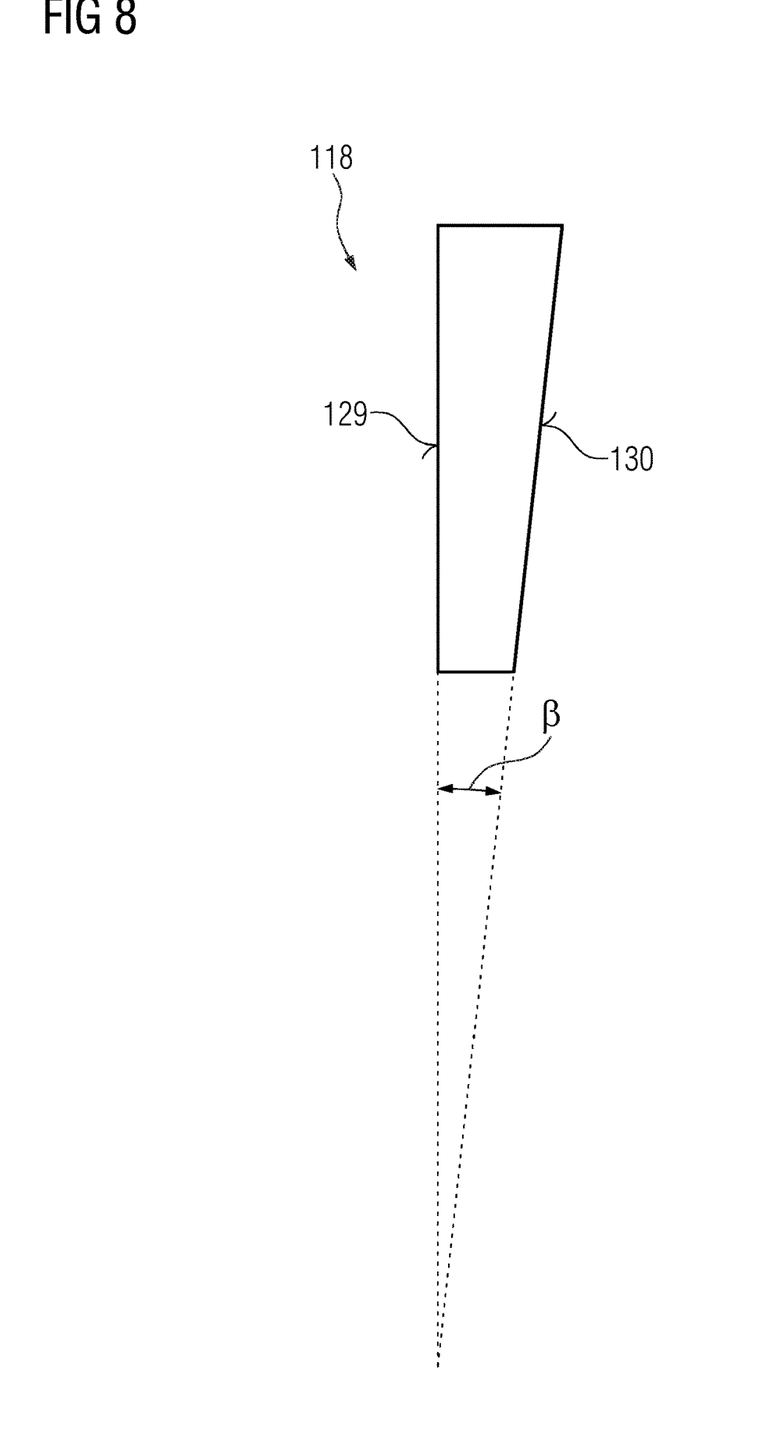
FIG. 8 depicts a first example for compensating for a misalignment between the axis of the through-hole and the axis of the stay cable.

FIG. 8 shows a first example for compensating for an angle deviation between the axis A1 of the through-hole 20 and the axis A2 of the stay cable 11. Shown in FIG. 8 are an anchoring plate 118 including two plate surfaces 129, 130 being inclined to each other by an angle β. There may be provided several anchoring plates 118 with different angles θ of at least 0.5°, 1°, 2°, 3°, 4° and 5° which can be selected based on the existing misalignment (angle α, FIG. 7).

Figure 9:
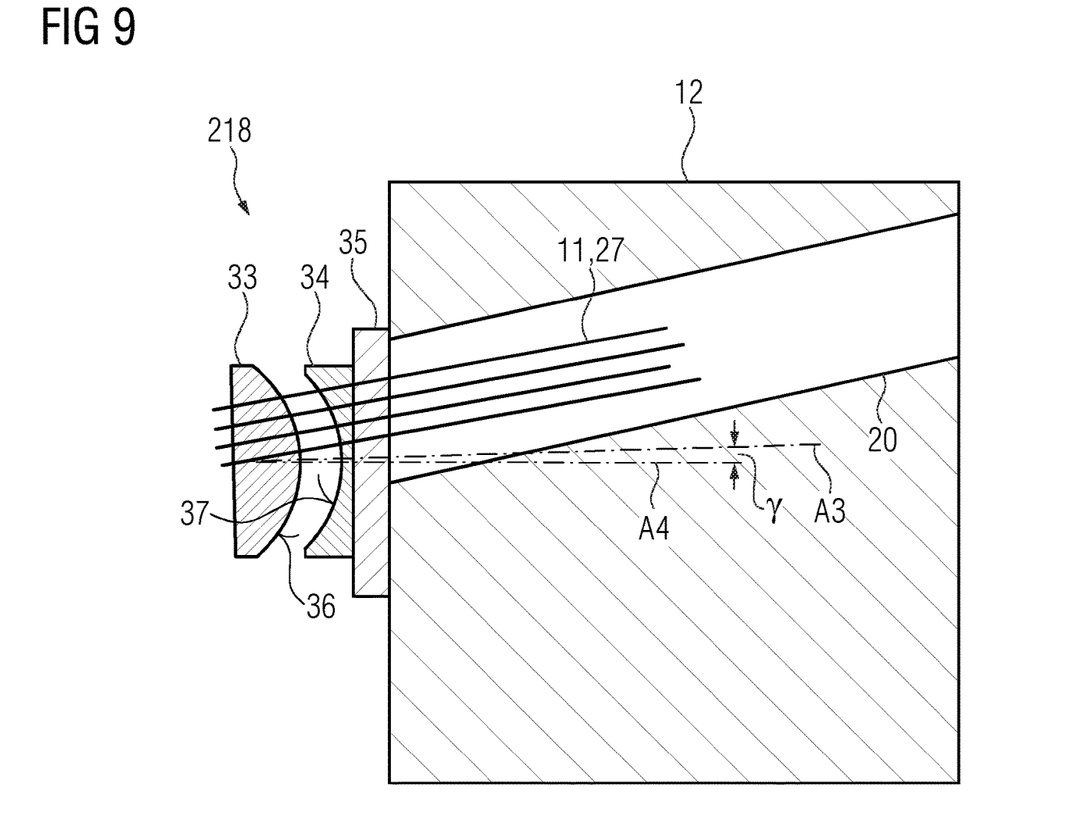
FIG. 9 depicts a second example for compensating for a misalignment between the axis of the through-hole and the axis of the stay cable.

FIG. 9 shows a second example for compensating for an angle deviation between the axis A1 of the through-hole 20 and the axis A2 of the stay cable 11. Shown in FIG. 9 is an anchoring means 218 comprising a spherical washer 33, a mating concave nut 34 and an anchoring plate 35. The spherical washer 33 is arranged, with respect to the first end 13 (FIG. 2) of the stay cable 11, behind the anchoring plate 35. In particular, a spherical surface 36 of the spherical washer 33 faces the anchoring plate 35. Furthermore, the mating concave nut 34 is arranged between the spherical washer 33 and the anchoring plate 35 such that a concave surface 37 of the mating concave nut 34 engages with the spherical surface 36 of the spherical washer 33.

In response to a misalignment of the axis A1 and the axis A2 (FIG. 7), the spherical washer 33 and the mating concave nut 34 will rotate relative to each other in a self-adjusting manner. In particular, an angle (y) between a rotational-symmetry axis A3 of the spherical washer 33 and a rotational-symmetry axis A4 of the mating concave nut 34 is adjusted.

Figure 10:
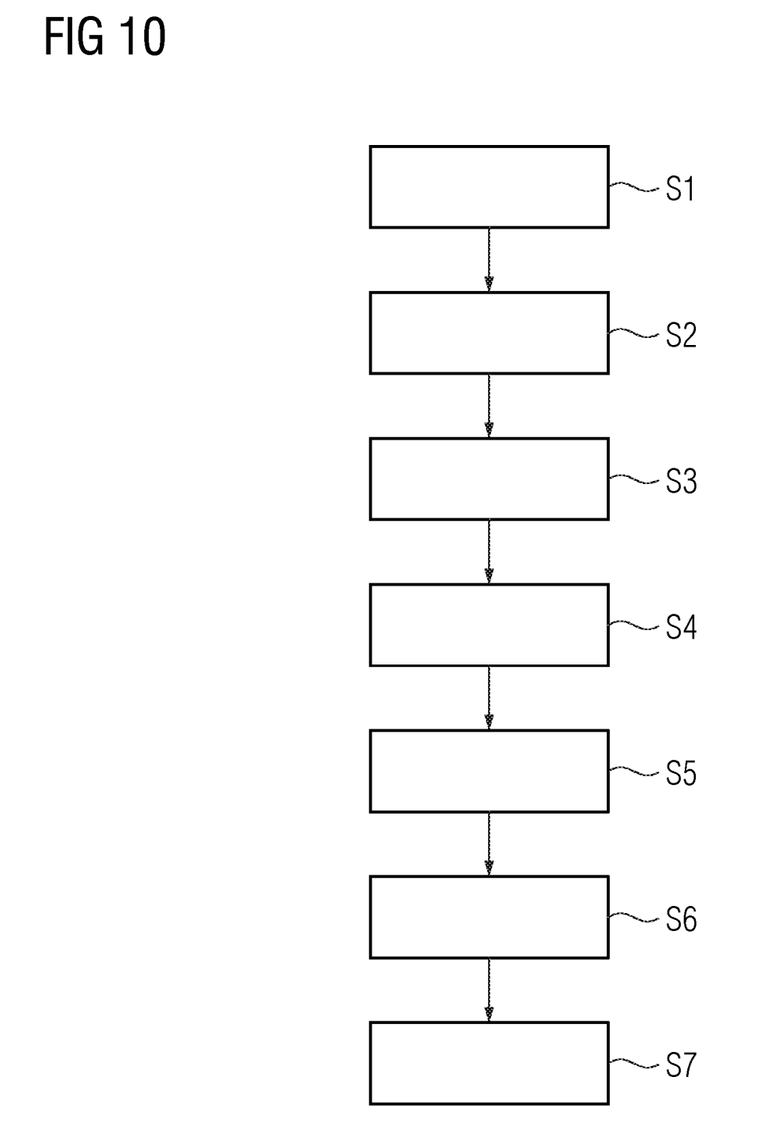
FIG. 10 depicts a flowchart illustrating a method for erecting the wind turbine of FIG. 1.

In the following, a method for erecting the wind turbine 1 of FIG. 1 is described with reference to FIG. 10.

In step S1 of the method, an erected tower 6 or tower section(s) 8, 9 are provided (FIG. 1).

In step S2 of the method, the stay cables 11 are connected to the tower 6 and/or the tower section 9.

Step S2 may be carried out after step S1 or before step S1. For example, the stay cables 11 may be connected to the tower 6 and/or the tower section 9 prior to erecting the tower or to lifting the tower section 9. Alternatively, the stay cables 11 may also be connected to the tower 6 or tower section 9 after erecting the tower 6 or lifting the tower section 9.

It is noted that step S2 may also be carried out after steps S4 and S5.

In step S3 of the method, at least one cable foundation 12, 112, 212 including a through-hole 20, 120 is provided (FIGS. 3, 5).

In step S4 of the method, each stay cable 11 is guided through the through-hole 20, 120 of a respective cable foundation 12, 112, 212.

In the case in which step S4 is carried out after step S2, i.e. in which the stay cables 11 are already anchored at the tower 6, the stay cables 11 are guided through the through-hole 20, 120 without having the cable head 26 (FIG. 4). For example, the individual tendons 27 of each stay cable 11 are guided together or one-by-one through the through-hole 20, 120.

In step S5 of the method, each stay cable 11 is anchored at its second end 15 behind (with respect to its first end 13) the respective through-hole 20, 120 using the anchoring means 18, 118, 218.

In particular, the stay cables 11 are guided through a through-hole 38 of the anchoring plate 18, 118, 218 (FIG. 4). After guiding the stay cables 11 through the through-holes 20, 120 of the cable foundations 12, 112, 212 and the through-holes 38 of the anchor plates 18, 118, 218, the cable head 26 is connected to each stay cable 11 (FIG. 4).

In the case in which step S2 (anchoring the stay cables 11 at the tower 6 or tower section 9) is carried out after steps S4 and S5 (anchoring the stay cables 11 at the cable foundations 12, 112, 212), the cable head 26 may be attached to each stay cable 11 before guiding the stay cables 11 through the through-hole 38 of the anchoring plate 18, 118, 218 and through the through-hole 20, 120 of the cable foundations 12, 112, 212.

In step S6 of the method, a potential misalignment between the axis A1 of the through-hole 20, 120 and the axis A2 of a respective stay cable 11 (FIG. 7) may be compensated. Step S6 is optional. Step S6 may be carried out simultaneously with step S5.

Such a compensation is, for example, carried out by selecting an anchoring plate 18, 118 from a group comprising an anchoring plate 18 whose two plate surfaces 29, 30 are parallel to each other and anchoring plates 118 whose two plate surfaces 129, 130 are inclined to each other by an angle β of at least 0.5°, 1°, 2°, 3°, 4° and 5° (FIG. 8).

Alternatively, the anchoring means 218 comprise, for example, a spherical washer 33, a mating concave nut 34 and an anchoring plate 35 (FIG. 9). The spherical washer 33 and the mating concave nut 34 will rotate relative to each other in a self-adjusting manner in case of a misalignment between the axis A1 of the through-hole 20, 120 and the axis A2 of a respective stay cable 11.

In step S7 of the method, the stay cables 11 are tensioned between its first end 13 anchored at the first anchoring point 14 at the tower 6 or tower section 9 and its second end 15 anchored at the second anchoring point 16 at the respective anchoring means 18, 118, 218.

Tensioning means may be arranged either at the first anchoring point 14 at the tower 6 or tower section 9 or at the second anchoring point 16 at the respective anchoring means 18, 118, 218. Step S7 may be carried out during or directly after step S2 or step S5.

Although the present invention has been described in accordance with preferred embodiments, it is obvious for the person skilled in the art that modifications are possible in all embodiments.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A tower arrangement for a wind turbine, comprising:
   a guyed tower;
   one or more cable foundation blocks each including a through-hole, the one or more cable foundation blocks having at least a front side and a back side;
   one or more stay cables, each stay cable being anchored at a first end at the guyed tower and being anchored at a second end by one of the one or more cable foundation blocks; and
   one or more anchoring means disposed at the back side of the one or more cable foundation blocks for anchoring the second end of each stay cable at a respective cable foundation block;
   wherein each stay cable is guided through a respective through-hole of the respective cable foundation block and anchored, with respect to the first end, behind the respective through-hole at the second end using the one or more anchoring means, the one or more anchoring means engaging the back side of the respective cable foundation block behind the respective through-hole.

2. The tower arrangement according to claim 1, wherein each of the one or more anchoring means engage with the respective cable foundation block in a form fit.

3. The tower arrangement according to claim 1, wherein each of the one or more anchoring means include an anchoring plate, and a size of the one or more anchoring plates is larger than a diameter of the through-hole of the respective cable foundation block.

4. The tower arrangement according to claim 1, wherein one, several or all of the one or more anchoring means include means to compensate for a misalignment between an axis of a through-hole and an axis of a respective stay cable.

5. The tower arrangement according to claim 1, wherein each of the one or more anchoring means includes an anchoring plate, and each anchoring plate includes two plate surfaces being parallel to each other or inclined to each other by an angle of at least 0.5°, 1°, 2°, 3°, 4° and/or 5°.

6. The tower arrangement according to claim 1, wherein:
one, several or all of the one or more anchoring means include a spherical washer, a mating concave nut and an anchoring plate;
the spherical washer is arranged, with respect to the first end of the respective stay cable, behind the anchoring plate with a spherical surface of the spherical washer facing the anchoring plate; and
the mating concave nut is arranged between the spherical washer and the anchoring plate such that a concave surface of the mating concave nut engages with the spherical surface of the spherical washer.

7. The tower arrangement according to claim 1, wherein each stay cable comprises at its second end a cable head including a flange resting against the anchoring means.

8. The tower arrangement according to claim 1, wherein one, several or all of the one or more cable foundations are arranged above ground or at least partly below ground.

9. The tower arrangement according to claim 1, wherein one, several or all of the one or more cable foundations include a cavity accommodating the respective anchoring means and the second end of the respective stay cable.

10. The tower arrangement according to claim 1, wherein the one or more cable foundation blocks are a concrete block or a reinforced concrete block containing metal.

11. The tower arrangement according to claim 1, wherein the one or more cable foundation blocks have a shape selected from the group consisting of: a cuboid, a cube, a cylinder, and a parallelepiped.

12. The wind turbine comprising a tower arrangement according to claim 1.

13. A method for erecting a wind turbine, comprising:
a) providing an erected tower or tower section;
b) connecting at least one stay cable at a first end to the erected tower or tower section;
c) providing at least one cable foundation block including a through-hole;
d) guiding each stay cable through the through-hole of a respective cable foundation block; and
e) anchoring each stay cable at a second end, with respect to the first end, behind the respective through-hole using anchoring means that engages a back side of the respective cable foundation block behind the respective through-hole.

14. The method according to claim 13, further comprising compensating for a misalignment between an axis of a through-hole and an axis of a respective stay cable.

15. The method according to claim 14, wherein one or more of the anchoring means include an anchoring plate having two plate surfaces, and wherein the step of compensating for a misalignment includes selecting the respective anchoring plate from a group comprising an anchoring plate whose two plate surfaces are parallel to each other and anchoring plates whose two plate surfaces are inclined to each other by an angle of at least 0.5°, 1°, 2°, 3°, 4° and 5°.

16. The method according to claim 14, wherein one or more of the anchoring means include an anchoring plate, a spherical washer and a mating concave nut, and wherein the step of compensating for a misalignment includes engaging, for a respective anchoring means, a spherical surface of the spherical washer with a concave surface of the mating concave nut such that an angle between an axis of the spherical washer and an axis of the mating concave nut is adjusted.

* * * * *